Dec. 12, 1933. F. T. COPE ET AL 1,938,581
COUNTERFLOW RECUPERATIVE FURNACE
Filed Nov. 21, 1931 6 Sheets-Sheet 1

Inventors
F. T. Cope
W. S. Bowling
By Frease and Bishop Attorneys

Figure 1:
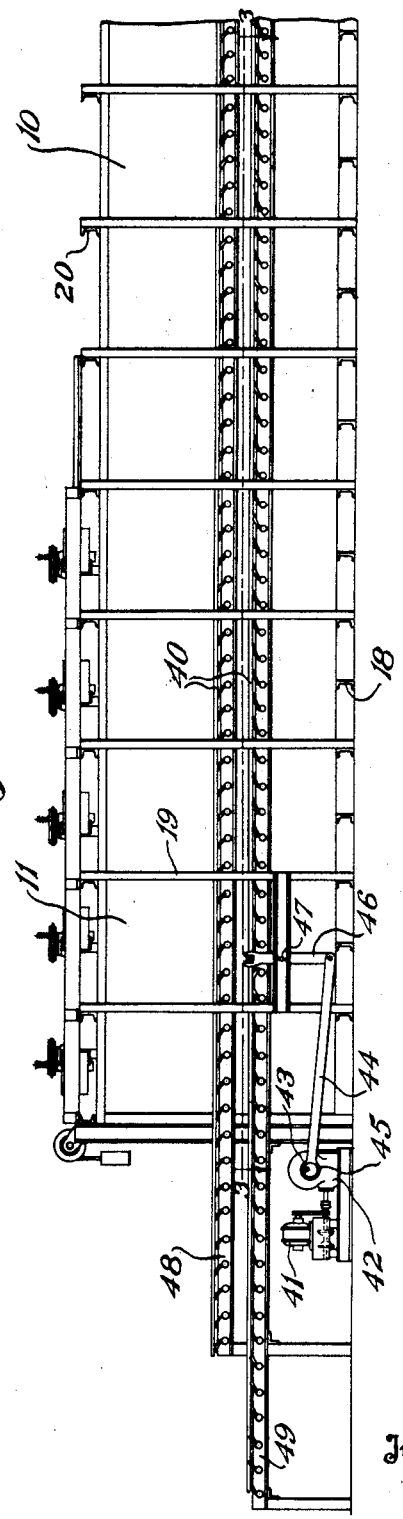

Dec. 12, 1933.   F. T. COPE ET AL   1,938,581
COUNTERFLOW RECUPERATIVE FURNACE
Filed Nov. 21, 1931   6 Sheets-Sheet 2
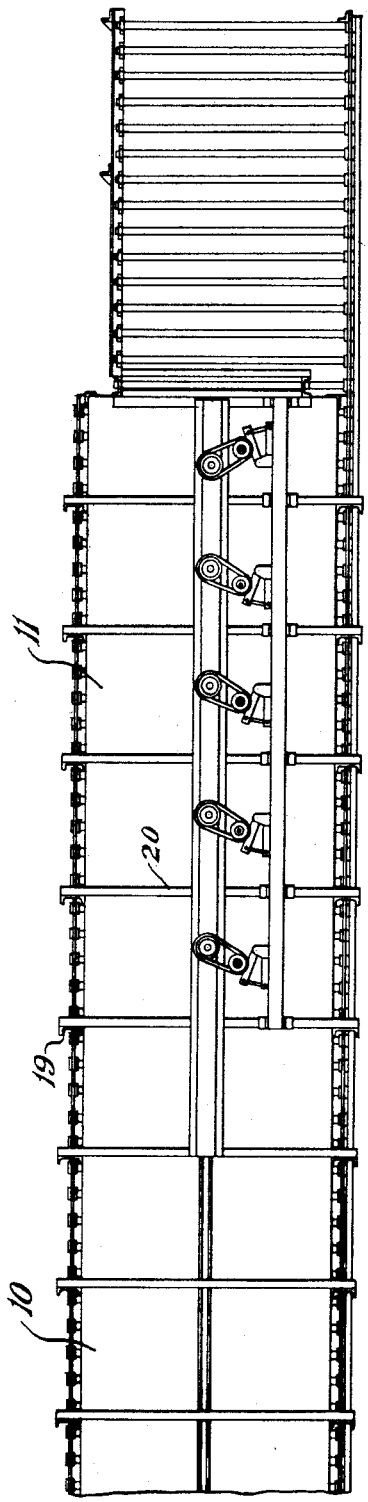
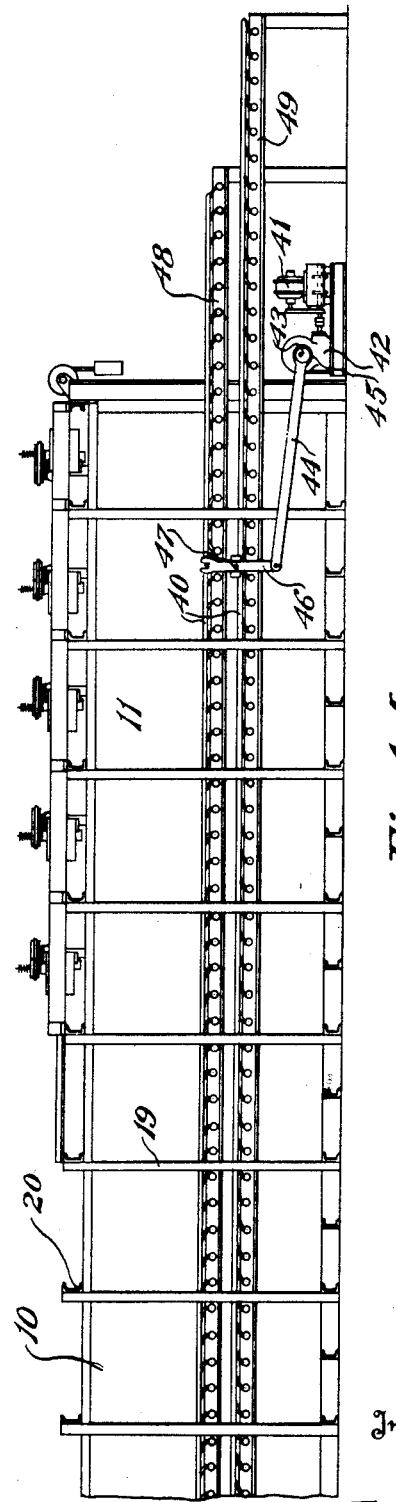
Fig. 2-A.
Fig. 1-A.
Inventors
F. T. Cope
W. S. Bowling
By Frease and Bishop Attorneys Dec. 12, 1933. F. T. COPE ET AL 1,938,581
COUNTERFLOW RECUPERATIVE FURNACE
Filed Nov. 21, 1931 6 Sheets-Sheet 3

Inventors
F. T. Cope
W. S. Bowling
By Frease and Bishop Attorneys

Dec. 12, 1933.  F. T. COPE ET AL  1,938,581
COUNTERFLOW RECUPERATIVE FURNACE
Filed Nov. 21, 1931   6 Sheets-Sheet 4

Inventors
F. T. Cope
W. S. Bowling
By Frease and Bishop
Attorneys

Patented Dec. 12, 1933

1,938,581

UNITED STATES PATENT OFFICE 1,938,581

COUNTERFLOW RECUPERATIVE FURNACE

Frank T. Cope and Wilbur S. Bowling, Salem, Ohio, assignors to The Electric Furnace Company, Salem, Ohio, a corporation of Ohio Application November 21, 1931
Serial No. 576,550

19 Claims. (Cl. 25—142)

The invention relates to recuperative furnaces in which there is a counterflow of material, and the embodiment of the invention disclosed herein is intended for the firing of decalcomania decorations upon pottery ware, although it should be understood that the usefulness of the invention is not limited to this process.

An object of the improvement is to provide a continuous counterflow furnace or kiln wherein the work is discharged, after the completion of the heating operation, at a temperature considerably below the maximum temperature to which it has been heated, a large part of the heat removed from the outcoming work being utilized to assist in the initial heating of ingoing work.

Another object is to provide a continuous counterflow recuperative furnace wherein two trains of work are passed through the furnace one above the other, thus requiring considerably less floor space than is necessary where the two trains of material are disposed side by side at the same level.

A further object is to provide a counterflow recuperative furnace having a relatively small external area as compared with its heating capacity whereby radiation loss is held at a minimum.

A still further object is to provide a counterflow recuperative furnace with efficient work conveying means which may be positively driven from a source of mechanical energy and which is free from unlubricated bearings or bearings exposed to high temperatures.

Still another object of the improvement is to provide means for rapidly transferring heat from outgoing work, after it has been heated to the required temperature, to ingoing work whereby the desired amount of heat may be rapidly interchanged and the recuperative chambers made relatively short.

Figure 2:
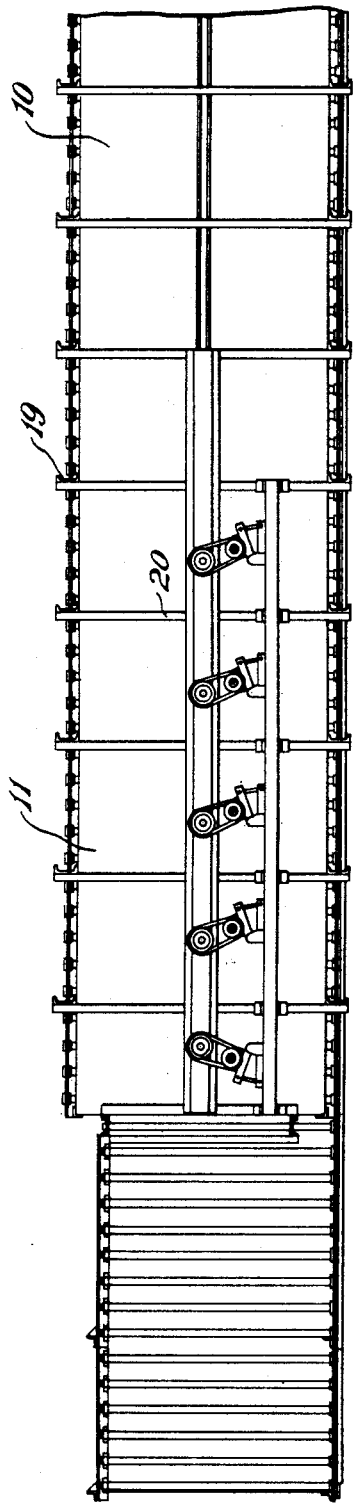
Figure 3:
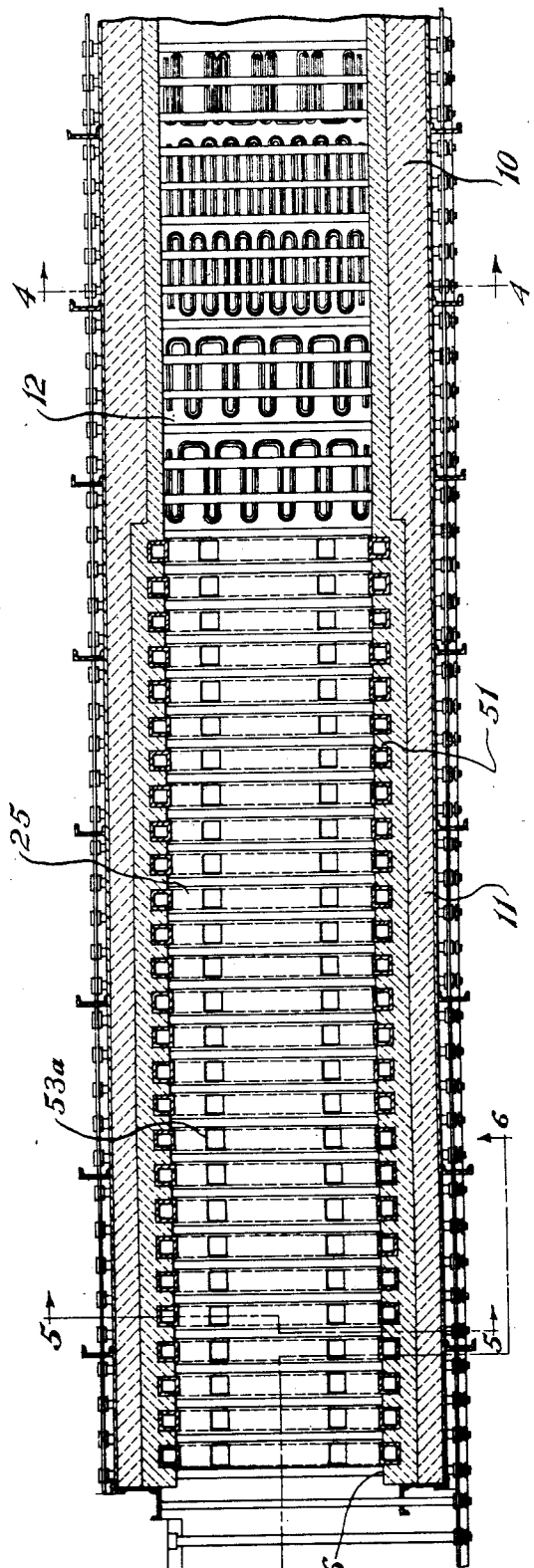
Figure 4:
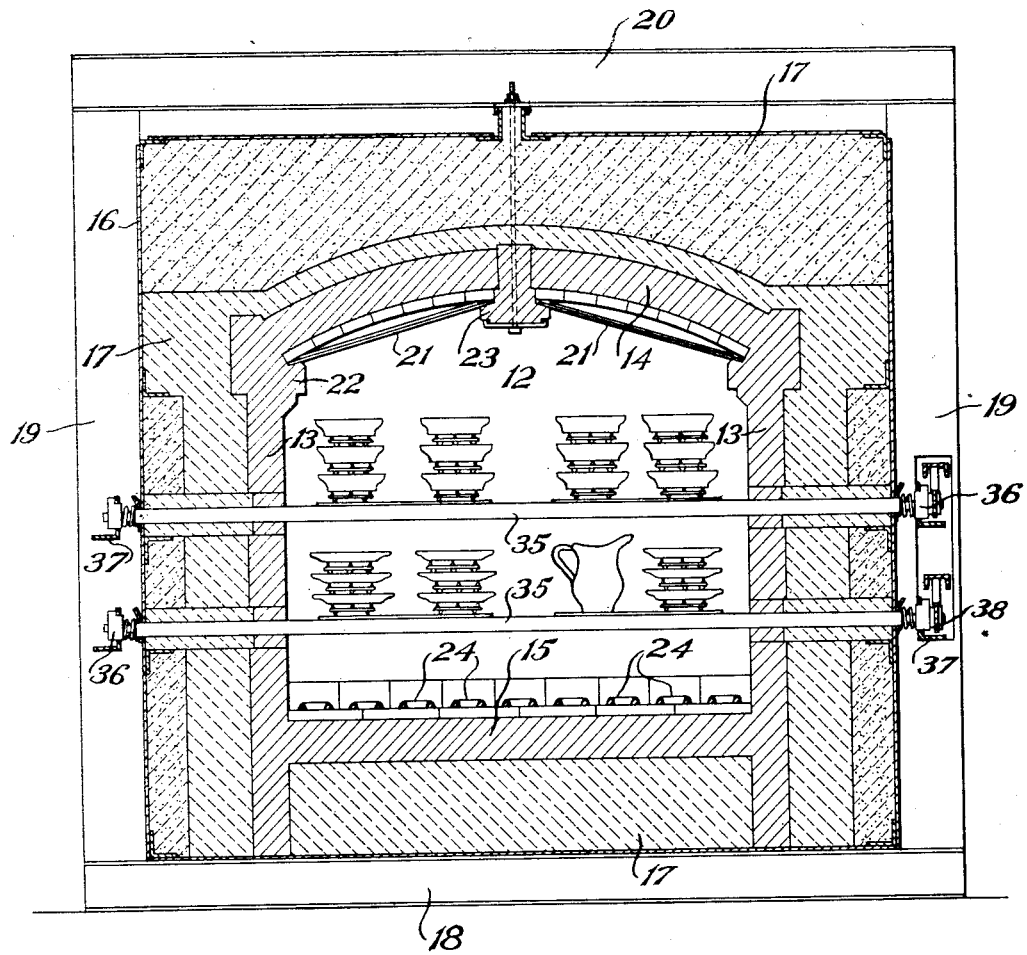
Figure 7:
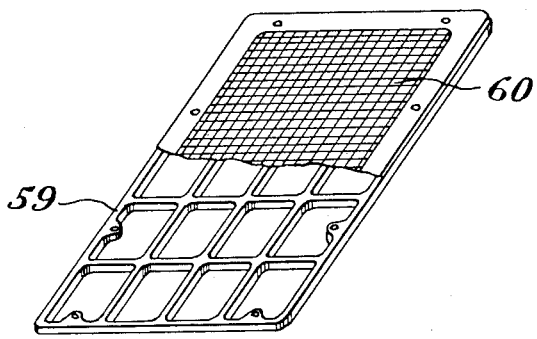
Figure 5:
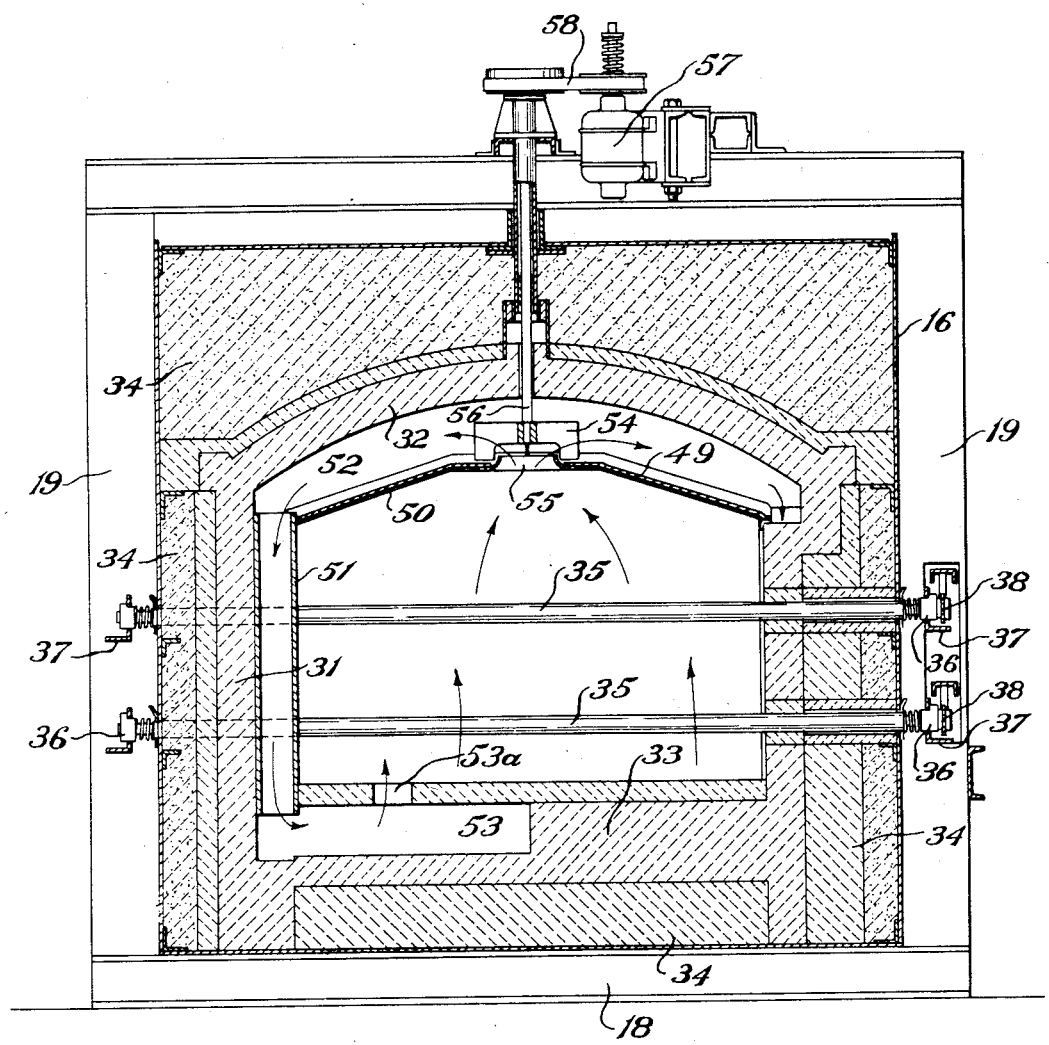
Figure 6:
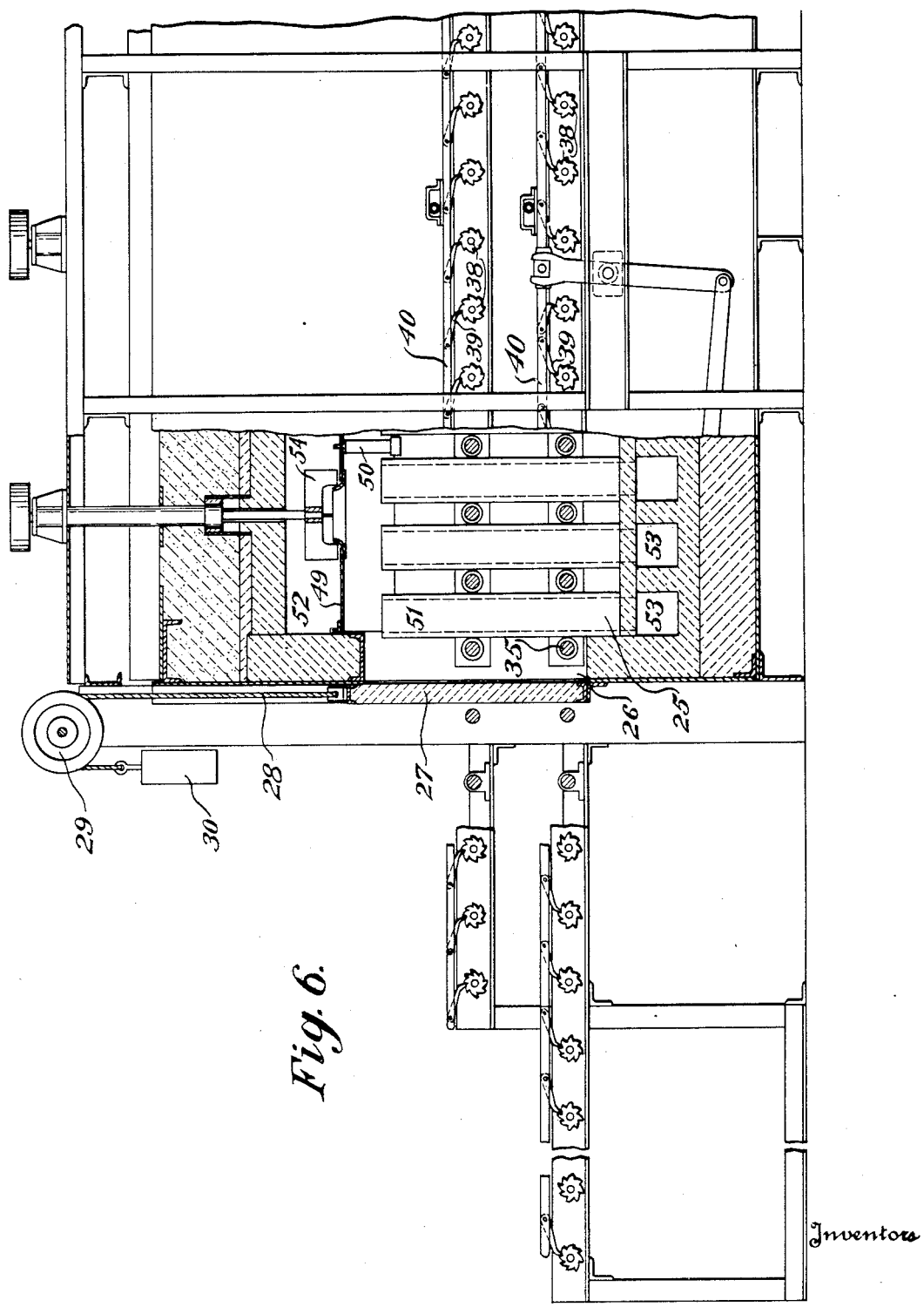

The above, together with other objects which will be hereinafter pointed out or which will be apparent from the following description, may be attained by constructing the improved counterflow recuperative furnace in the manner illustrated in the accompanying drawings, in which Figure 1 is a side elevation of substantially one-half of a pottery decorating kiln embodying the invention;

Fig. 1a, a similar view of the other half of the kiln;

Fig. 2, a top plan view of the portion of the kiln illustrated in Fig. 1;

Fig. 2a, a similar view of the portion of the kiln illustrated in Fig. 1a;

Fig. 3, a plan sectional view, on a slightly larger scale, taken as on the line 3—3, Fig. 1;

Fig. 4, a transverse sectional view through the heating chamber on a larger scale, as on the line 4—4, Fig. 3;

Fig. 5, a transverse sectional view through one of the recuperative chambers as on the line 5—5, Fig. 3;

Fig. 6, a longitudinal sectional elevation taken as on the line 6—6, Fig. 3; and Fig. 7, a detail perspective view with parts broken away of a work carrying tray especially adapted for use in the decorating kiln.

Similar numerals refer to similar parts throughout the drawings.

The improved furnace or kiln to which the invention pertains is of elongated shape as illustrated in the drawings and comprises the heating chamber portion indicated generally at 10, located substantially midway between the ends of the furnace, and the two heat interchange or recuperative chamber portions 11 communicating with opposite ends of the heating chamber.

The heating chamber 12 is provided within the central portion 10 of the furnace and may be defined by the refractory side walls 13, roof 14 and bottom 15 incased by the steel shell 16. Any suitable heat insulation material 17 may be provided between said refractory walls and the steel shell of the furnace so as to reduce the radiation loss to a minimum. If desired, the entire furnace structure may be supported above the floor upon any suitable structural members as shown at 18. Buckstays 19 may be located upon each side of the furnace shell and connected at their upper ends as by the tiebars 20.

Any suitable means may be provided for producing the desired temperature in the heating chamber. For the purpose of illustration, the heating chamber is shown as heated electrically, resistors 21 being suspended in the upper portion of the heating chamber, adjacent to the roof, as by the ledges 22 and 23, and additional resistors 24 may be provided in the bottom of the heating chamber.

The recuperative chambers 25 are located in the end portions 11 of the furnace, communicating at their inner ends with the opposite ends of the heating chamber and provided at their outer ends with doorways 26 which may be closed as by the sliding doors 27 suspended upon cables 28 located over the pulleys 29, counterweights 30 being provided upon the cables as in ordinary practice.

Each recuperative chamber includes the side walls 31, roof 32 and bottom 33 which may be incased within the shell 16, suitable insulation material as indicated at 34 being preferably provided between the shell and walls.

For the purpose of conveying work through the recuperative and heating chambers in two oppositely moving trains, two supports, which may be in the form of conveyers, are located through the chambers at two levels, one above the other, each conveyer being adapted to carry a train of work through the furnace in a direction opposite to the other.

As illustrated, these supports or conveyers may be in the form of rollers 35 adapted to be rotated continuously or intermittently in any suitable manner from an electric motor or other driving means.

The rollers 35 are preferably extended through suitable openings in the side walls and steel shell and journaled in bearings 36 located outside of the casing where the bearing temperature will not be excessive and the performance of the bearings will consequently be good. These bearings may be carried by structural members such as the angle irons 37 which are supported upon the buckstays 19.

In order that the rollers 35 on each level may be continuously or intermittently rotated in unison, a ratchet wheel 38 may be fixed upon one end of each roller 35 for engagement with the pawls or detents 39 carried by the sliding bars 40 which may be of inverted channel form as illustrated. Each of the bars 40 may be reciprocated by any suitable mechanism driven by an electric motor 41 or other prime mover.

For the purpose of illustration, each motor is shown operatively connected to a gear reduction indicated generally at 42 and provided with an eccentric 43, a link 44 being provided with an eccentric band 45 surrounding said eccentric, the link being connected to one end of a lever 46 fulcrumed intermediate its ends upon a stationary portion of the apparatus as indicated at 47, the other end of the lever being pivotally connected to one of the reciprocating bars 40.

As shown on the drawings, the roller conveyers or tables may extend beyond both ends of the furnace by locating the rollers in suitable frame members 48 and 48', the lower frame 48' being of greater length than the upper so as to provide loading and unloading stations, outside of the furnace, for the two trains of work.

It is, of course, understood that counterflow recuperative furnaces have been built wherein two trains of material are arranged to move in opposite directions, side by side upon the same level. In such furnaces the interchange of heat is accomplished principally by direct radiation assisted to some slight extent by some convection currents upward through the outcoming work and downward through the adjacent train of ingoing cool work.

It will be apparent that heat transfer will be effected in the recuperative chambers of the present furnace by direct radiation in a manner equally as effective as in the construction above referred to.

It will also be seen that in one of the recuperative chambers of the present furnace the outcoming hot work will be upon the lower conveyer or roller table and the incoming work will be on the upper conveyer, thus producing natural convection currents which will assist in the transfer of heat from the outcoming to the ingoing train of work.

However, in the other recuperative chamber, the outcoming work, from which it is desired to transmit heat to the incoming work, will be on the upper conveyer and for this reason convection currents will not be produced since the heated air will tend to remain in the upper portion of the chamber.

For the purpose of providing effective heat transfer, the present invention contemplates the provision of means for causing air to flow in a substantially vertical direction through the work in each recuperative chamber, thereby transferring heat from the outcoming hot work to the ingoing work.

For this purpose baffles 49 are provided through each recuperative chamber, being spaced beneath the roof 32 thereof and supported by any suitable means such as the structural members 50.

A plurality of vertical ducts 51 are provided in the side walls of the recuperative chambers and communicate at their upper ends with the space, indicated at 52, between the baffles 50 and the roof. At their lower ends these ducts communicate with the transverse passages or ducts 53 formed in the bottom of each recuperative chamber and communicating through openings 53a with the lower portion of the corresponding recuperative chamber.

Fans or the like, as indicated at 54, are mounted in the space 52, above the baffles 49, the fans being preferably centrally located and each being mounted adjacent to an opening 55 in the adjacent baffle plate 50.

These fans may be mounted upon shafts 56 extending through the roof of the recuperative chamber and adapted to be operated by motors or the like indicated at 57 and operatively connected to the shafts as by the belt gearing shown generally at 58.

These fans may be arranged to cause a circulation of air downward in the recuperative chamber, through the openings 53a into the transverse ducts 53 and then upward through the vertical ducts 51 or the circulation may be upward through the recuperative chamber, through the openings 55 to the space 52, then downward through the vertical ducts 51 to the transverse ducts 53 and upward through the openings 53a to the recuperative chamber, in the manner best shown in Fig. 5 of the drawings. For this purpose a centrifugal type of fan is used while an impeller type of fan may be used if it is desired to circulate the air in the other direction.

If desired, the circulation may be upward through the recuperative chamber in which the outcoming hot work is on the lower conveyer, and downward through the recuperative chamber in which the hot outcoming work is on the upper conveyer. In either case it will be seen that the use of forced air circulation makes the transfer of heat much more rapid than it would be if only natural convection were depended upon.

The embodiment of the invention illustrated in the accompanying drawings is intended for the firing of decorations on pottery ware, and for this reason the centrifugal fans are preferred. In this operation it is very detrimental to the ware if any dust or foreign matter is permitted to lodge thereon, particularly prior to its passage through the heating chamber. By using the centrifugal type of fan causing the upward circulation through the recuperative chamber, as illustrated in Fig. 5, the possibility of dust or foreign matter dropping upon the ware is reduced to a minimum.

It has been found by experience that in any refractory lined structure there is a tendency for fragments of refractory material, mortar and the like to become detached from the roof and walls due to thermal expansion and contraction thereof. It will be seen that such fragments falling from the roof of the kiln or furnace illustrated will be carried laterally by the flow of air to the ducts 51, passing downward through the same and being deposited in the transverse ducts or passages 53 which are purposely made of large enough sectional area so that the air velocity therein is comparatively low.

Although some kinds of work may be carried directly upon the conveyer rollers, other kinds, such for instance as pottery ware, must be loaded upon trays in order to be conveyed upon the rollers, as shown in Fig. 4. This tray, as shown in detail in Fig. 7, may consist of a framework 59, preferably formed of heat resisting alloy metal, which may be covered with a sheet of perforated or expanded metal 60 forming a surface with sufficiently small openings to prevent any of the work from falling through while at the same time providing sufficient open space to permit the vertical flow of air through the tray and through and around the ware carried thereon.

We claim:

1. A recuperative furnace including a heating chamber and a recuperative chamber communicating therewith, means for passing work longitudinally through both chambers in two oppositely moving trains one above the other, and means in the recuperative chamber for forcing a current of air in a generally vertical direction through both trains of work.

2. A recuperative furnace including a heating chamber and a recuperative chamber communicating therewith, means for passing work longitudinally through both chambers in two oppositely moving trains one above the other, and a fan in the recuperative chamber for forcing a current of air in a generally vertical direction through both trains of work.

3. A recuperative furnace including a heating chamber and a recuperative chamber communicating therewith, means for passing work longitudinally through both chambers in two oppositely moving trains one above the other, a baffle in the upper portion of the recuperative chamber, a substantially vertical duct opening at its upper end above the baffle, a transverse duct in the bottom of the recuperative chamber communicating with the lower end of the vertical duct and with the lower portion of the recuperative chamber, and means for causing a current of air to flow in a generally vertical direction through the recuperative chamber and to return through said ducts.

4. A recuperative furnace including a heating chamber and a recuperative chamber communicating therewith, means for passing work longitudinally through both chambers in two oppositely moving trains one above the other, a baffle in the upper portion of the recuperative chamber, a substantially vertical duct opening at its upper end above the baffle, a transverse duct in the bottom of the recuperative chamber communicating with the lower end of the vertical duct and with the lower portion of the recuperative chamber, and a fan for causing a current of air to flow in a generally vertical direction through the recuperative chamber and to return through said ducts.

5. A recuperative furnace including a heating chamber, a recuperative chamber communicating with each end of the heating chamber, and means for passing work through the recuperative chambers and heating chamber in two oppositely moving trains one above the other.

6. A recuperative furnace including a heating chamber, a recuperative chamber communicating with each end of the heating chamber, and conveyer rollers for passing work through the recuperative chambers and heating chamber in two oppositely moving trains one above the other.

7. A recuperative furnace including a heating chamber, a recuperative chamber communicating with each end of the heating chamber, means for passing work through the recuperative chambers and heating chamber in two oppositely moving trains one above the other, and means in each recuperative chamber for forcing a current of air to pass in a generally vertical direction through both trains of work.

8. A recuperative furnace including a heating chamber, a recuperative chamber communicating with each end of the heating chamber, means for passing work through the recuperative chambers and heating chamber in two oppositely moving trains one above the other, and a fan in each recuperative chamber for forcing a current of air to pass in a generally vertical direction through both trains of work.

9. A recuperative furnace including a heating chamber, a recuperative chamber communicating with each end of the heating chamber, means for passing work through the recuperative chambers and heating chamber in two oppositely moving trains one above the other, and means in each recuperative chamber for causing a circulation of air in substantially vertical direction through the ingoing and outcoming work successively.

10. A recuperative furnace including a heating chamber, a recuperative chamber communicating with each end of the heating chamber, means for passing work through the recuperative chambers and heating chamber in two oppositely moving trains one above the other, an air duct in each recuperative chamber communicating at opposite ends with the upper and lower portions of said chamber, and means for producing a circulation of air in a generally vertical direction through both trains of work in each recuperative chamber and through said air duct.

11. A recuperative furnace including a heating chamber, a recuperative chamber communicating with each end of the heating chamber, means for passing work through the recuperative chambers and heating chamber in two oppositely moving trains one above the other, an air duct in each recuperative chamber communicating at opposite ends with the upper and lower portions of said chamber, and a fan for producing a circulation of air in a generally vertical direction through both trains of work in each recuperative chamber and through said air duct.

12. A recuperative furnace including a heating chamber, a recuperative chamber communicating with each end of the heating chamber, means for passing work through the recuperative chambers and heating chamber in two oppositely moving trains one above the other, an air duct in each recuperative chamber communicating at opposite ends with the upper and lower portions of said chamber, and a centrifugal fan for producing a circulation of air in a generally vertical direction through both trains of work in each recuperative chamber and through said air duct.

13. A recuperative furnace including a heating chamber, a recuperative chamber communicating therewith, means for passing work longitudinally through both chambers in two oppositely moving trains one above the other, and means for causing a circulation of air in the recuperative chamber in substantially vertical direction through the ingoing and outcoming trains of work successively.

14. A recuperative furnace including a heating chamber, a recuperative chamber communicating therewith, means for passing work longitudinally through both chambers in two oppositely moving trains one above the other, and a fan in the recuperative chamber for causing a circulation of air in substantially vertical direction through the ingoing and outcoming trains of work successively.

15. A recuperative furnace including a heating chamber, a recuperative chamber communicating therewith, means for passing work longitudinally through both chambers in two oppositely moving trains one above the other, a duct communicating at opposite ends with the upper and lower portions of the recuperative chamber, and means within the recuperative chamber for causing a current of air to flow in a generally vertical direction through both trains of work and to return through said duct.

16. A recuperative furnace including a heating chamber and a recuperative chamber communicating therewith, means for passing work longitudinally through both chambers in two oppositely moving trains one above the other, and means for forcing a current of air successively through the outcoming and ingoing trains of work in the recuperative chamber.

17. A recuperative furnace including a heating chamber, a recuperative chamber communicating with each end of the heating chamber, means for passing work through the recuperative chambers and heating chamber in two oppositely moving trains one above the other, and means for forcing a current of air successively through the outcoming and ingoing trains of work in each recuperative chamber.

18. A recuperative furnace including a heating chamber, a recuperative chamber communicating with each end of the heating chamber, means for passing work through the recuperative chambers and heating chamber in two oppositely moving trains one above the other, and a fan for forcing a current of air successively through the outcoming and ingoing trains of work in each recuperative chamber.

19. A recuperative furnace including a heating chamber and a recuperative chamber communicating therewith, means for passing work longitudinally through both chambers in two oppositely moving trains one above the other, and a fan for forcing a current of air successively through the outcoming and ingoing trains of work in the recuperative chamber.

FRANK T. COPE.
WILBUR S. BOWLING.